(12) United States Patent
Onizawa

(10) Patent No.: US 10,174,199 B2
(45) Date of Patent: Jan. 8, 2019

(54) RESIN COMPOSITION

(71) Applicant: TEIJIN LIMITED, Osaka (JP)

(72) Inventor: Tomomitsu Onizawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 89 days.

(21) Appl. No.: 15/037,759

(22) PCT Filed: Feb. 18, 2015

(86) PCT No.: PCT/JP2015/055308
§ 371 (c)(1),
(2) Date: May 19, 2016

(87) PCT Pub. No.: WO2015/125974
PCT Pub. Date: Aug. 27, 2015

(65) Prior Publication Data
US 2016/0304717 A1    Oct. 20, 2016

(30) Foreign Application Priority Data

Feb. 24, 2014 (JP) .................................. 2014-032957

(51) Int. Cl.
*C08L 81/04* (2006.01)
*C08L 69/00* (2006.01)

(52) U.S. Cl.
CPC ............... *C08L 81/04* (2013.01); *C08L 69/00* (2013.01); *C08L 2205/06* (2013.01)

(58) Field of Classification Search
CPC ...... C08L 69/00; C08L 81/04; C08L 2205/06; C08L 81/02; C08G 75/14; C08F 2500/04
USPC ......................................................... 524/500
See application file for complete search history.

(56) References Cited

U.S. PATENT DOCUMENTS

| | | | |
|---|---|---|---|
| 4,786,713 A | 11/1988 | Rule et al. | |
| 5,109,110 A * | 4/1992 | Ogata | C08G 75/0222 528/271 |
| 5,182,345 A * | 1/1993 | Bagrodia | C08L 81/02 525/462 |
| 2005/0118093 A1* | 6/2005 | Senga | C01B 17/22 423/566.2 |
| 2011/0237693 A1* | 9/2011 | Weber | C08J 5/18 521/91 |
| 2013/0115438 A1* | 5/2013 | Park | C08G 75/0204 428/221 |
| 2016/0304717 A1* | 10/2016 | Onizawa | C08L 69/00 |

FOREIGN PATENT DOCUMENTS

| | | | |
|---|---|---|---|
| CN | 102971362 | 3/2013 | |
| JP | 51-59952 | 5/1976 | |
| JP | 2008-231249 | 10/2008 | |
| JP | 2008-231250 | 10/2008 | |
| JP | 2010-070656 | 4/2010 | |
| WO | 93/01240 | 1/1993 | |
| WO | WO-2011142557 A2 * | 11/2011 | ......... C08G 75/0204 |

OTHER PUBLICATIONS

European Search Report dated Nov. 15, 2016 in corresponding European Application No. 15752596.5.
International Preliminary Report on Patentability dated Sep. 9, 2016 in corresponding (PCT) Application No. PCT/JP2015/055308.
International Search Report dated May 31, 2015 in corresponding International Application No. PCT/JP2015/055308.

* cited by examiner

*Primary Examiner* — Michael A Salvitti
(74) *Attorney, Agent, or Firm* — Wenderoth, Lind & Ponack, L.L.P.

(57) ABSTRACT

A resin composition which suppresses the decomposition of a polycarbonate resin at the time of molding while it retains the excellent characteristic properties of a polyarylene sulfide resin and has the excellent toughness, impact strength and burr reducing property of the polycarbonate resin.
The resin composition comprises (A) 99 to 1 part by weight of a polyarylene sulfide resin (component A) having a degree of dispersion (Mw/Mn) represented by weight average molecular weight (Mw) and number average molecular weight (Mn) of not less than 2.7 and (B) 1 to 99 parts by weight of a polycarbonate resin (component B) and has a total chlorine content of not more than 550 ppm and a total sodium content of not more than 30 ppm.

5 Claims, No Drawings

RESIN COMPOSITION

TECHNICAL FIELD

The present invention relates to a resin composition which comprises a polyarylene sulfide resin having a dispersion degree within a specific range and a polycarbonate resin, suppresses the decomposition of the polycarbonate resin at the time of molding while it retains the excellent characteristic properties of the polyarylene sulfide resin and has the excellent toughness, impact strength and burr reduction property of the polycarbonate resin.

BACKGROUND ART

Polyarylene sulfide resin is an engineering plastic having excellent chemical resistance, heat resistance and mechanical properties. Therefore, the polyarylene sulfide resin is widely used in electric and electronic parts, vehicle parts, aircraft parts and housing equipment parts. However, the polyarylene sulfide resin has a defect that it is inferior in toughness and impact strength and produces a burr at the time of molding.

To solve this problem, Patent Document 1 discloses a resin composition comprising a polyphenylene sulfide resin and a polycarbonate resin. However, since polyphenylene sulfide resins which have been available on the market contain chlorine and sodium as impurities due to the restrictions of the polymer polymerization process, the polycarbonate resin greatly decomposes at the time of molding, and excellent characteristic properties are not developed.

Patent Document 2 proposes a polyphenylene sulfide resin having a low content of chlorine. However, the decomposition of a polycarbonate resin cannot be suppressed simply by using this polyphenylene sulfide having a reduced content of chlorine. To reduce the content of chlorine, a reaction process becomes complicated, thereby reducing cost competitiveness.

Patent Document 3 discloses polyphenylene sulfide having a low content of an alkali metal. However, this does not aim at modification with a polycarbonate resin and is inferior in cost competitiveness.

Further, Patent Document 4 discloses a resin composition comprising a polyphenylene sulfide resin having a dispersion degree of not more than 2.5 and an alkali metal content of not more than 50 ppm and a thermoplastic resin. However, this does not aim at modification with a polycarbonate resin, particularly the suppression of a burr, and is unsatisfactory in terms of characteristic properties.

PRIOR ART DOCUMENTS (Patent Document 1) JP-A 51-59952
(Patent Document 2) JP-A 2010-70656
(Patent Document 3) JP-A 2008-231250
(Patent Document 4) JP-A 2008-231249

DISCLOSURE OF THE INVENTION

It is an object of the present invention to provide a resin composition which comprises a polyarylene sulfide resin and a polycarbonate resin and has excellent toughness, impact strength, burr reducing property and chemical resistance.

The inventors of the present invention conducted intensive studies and found that a resin composition comprising a polyarylene sulfide resin having a dispersion degree within a specific range and a polycarbonate resin and having a low content of chlorine and a low content of sodium suppresses the decomposition of the polycarbonate resin at the time of molding while it retains the excellent characteristic properties of the polyarylene sulfide resin and can develop excellent toughness, impact strength, burr reducing property and chemical resistance.

Stated more specifically, the above object is attained by a resin composition (1) which comprises (A) 99 to 1 part by weight of a polyarylene sulfide resin (component A) having a dispersion degree (Mw/Mn) represented by weight average molecular weight (Mw) and number average molecular weight (Mn) of not less than 2.7 and (B) 1 to 99 parts by weight of a polycarbonate resin (component B) and has a total chlorine content of not more than 550 ppm and a total sodium content of not more than 30 ppm.

One of the preferred modes of the present invention is a resin composition having the above constitution (1) in which (2) the component A is a polyarylene sulfide resin having a total chlorine content of not more than 550 ppm and a total sodium content of not more than 30 ppm.

Another one of the preferred modes of the present invention is a resin composition having the above constitution (1) in which (3) the component A is a polyarylene sulfide resin having a total chlorine content of not more than 50 ppm and a total sodium content of not more than 8 ppm.

Still another one of the preferred modes of the present invention is a resin composition having the above constitution (1), (4) comprising 5 to 400 parts by weight of a filler (component C) based on 100 parts by weight of the total of the component A and the component B.

BEST MODE FOR CARRYING OUT THE INVENTION

The present invention will be described in detail hereinunder.

<Polyarylene Sulfide Resin (Component A)>

The polyarylene sulfide resin (component A) contains as a constituent unit, for example, a p-phenylene sulfide unit, m-phenylene sulfide unit, o-phenylene sulfide unit, phenylene sulfide sulfone unit, phenylene sulfide ketone unit, phenylene sulfide ether unit, diphenylene sulfide unit, phenylene sulfide unit containing a substituent or phenylene sulfide unit containing a branched structure. The polyarylene sulfide resin contains preferably not less than 70 mol %, particularly preferably not less than 90 mol % of the p-phenylene sulfide unit. The polyarylene sulfide resin is preferably poly(p-phenylene sulfide).

(Mw/Mn)

The degree of dispersion (Mw/Mn) represented by the weight average molecular weight (Mw) and the number average molecular weight (Mn) of the polyarylene sulfide resin (component A) is not less than 2.7, preferably not less than 2.8, more preferably not less than 2.9. When the degree of dispersion is less than 2.7, a large amount of burrs are produced at the time of molding disadvantageously. The upper limit of the degree of dispersion is not particularly limited but preferably not more than 10. The weight average molecular weight (Mw) and the number average molecular weight (Mn) are values calculated in terms of polystyrene by gel permeation chromatography (GPC). 1-chloronaphthalene was used as a solvent, and the column temperature was 210° C.

(Total Chlorine Content)

The total chlorine content of the polyarylene sulfide resin (component A) is preferably not more than 550 ppm, more preferably not more than 300 ppm, much more preferably not more than 50 ppm. When the total chlorine content becomes higher than 550 ppm, the polycarbonate resin decomposes at the time of molding, whereby expected characteristic properties are not developed and pelletization becomes impossible in a notable case. The lower limit of the total chlorine content of the polyarylene sulfide resin is preferably 100 ppb.

(Total Sodium Content)

The total sodium content of the polyarylene sulfide resin (component A) is preferably not more than 30 ppm, more preferably not more than 10 ppm, much more preferably not more than 8 ppm. When the total sodium content is higher than 30 ppm, the polycarbonate resin decomposes at the time of molding, whereby expected characteristic properties are not developed and pelletization becomes impossible in a notable case. The lower limit of the total sodium content of the polyarylene sulfide resin is preferably 10 ppb.

(Production Process)

The production process of the polyarylene sulfide resin (component A) is not particularly limited, and the polyarylene sulfide resin is polymerized by a known process. The production process described in U.S. Pat. No. 4,746,758 and U.S. Pat. No. 4,786,713 is a particularly preferred polymerization process. This production process is a process in which a diiodoaryl compound and solid sulfur are directly heated and polymerized without using a polar solvent.

The above production process comprises an iodizing step and a polymerization step. In the iodizing step, an aryl compound is reacted with iodine to obtain a diiodoaryl compound. In the subsequent polymerization step, a polymerization reaction between the diiodoaryl compound and solid sulfur is carried out by using a nitro compound catalyst to produce a polyarylene sulfide resin. Iodine is produced as a gaseous material in this step and collected to be re-used in the iodizing step. Iodine is substantially a catalyst.

Due to this polymerization process, the chlorine content and the sodium content do not need to be reduced substantially, and a polyphenylene sulfide resin having excellent cost performance and a low chorine content and a low sodium content can be obtained. The polyphenylene sulfide resin (component A) may contain a polyphenylene sulfide resin obtained by another polymerization process.

The content of the polyarylene sulfide resin (component A) is 99 to 1 part by weight, preferably 95 to 5 parts by weight, much more preferably 95 to 70 parts by weight or 30 to 5 parts by weight based on 100 parts by weight of the total of the components A and B.

<Polycarbonate Resin (Component B)>

The polycarbonate resin (component B) may be a polycarbonate resin having high heat resistance or a low water absorption coefficient which is polymerized by using another dihydric phenol besides a bisphenol A type polycarbonate which is generally used. The polycarbonate resin may be produced by any production process. In the case of interfacial polycondensation, a monohydric phenol terminal capping agent is generally used. The polycarbonate resin may be a branched polycarbonate resin obtained by polymerizing a trifunctional phenol or a copolycarbonate obtained by copolymerizing an aliphatic dicarboxylic acid or aromatic dicarboxylic acid or a dihydric aliphatic or alicyclic alcohol.

The viscosity average molecular weight of the polycarbonate resin (component B) is preferably $1.3 \times 10^4$ to $4.0 \times 10^4$, more preferably $1.5 \times 10^4$ to $3.8 \times 10^4$. The viscosity average molecular weight (M) of the aromatic polycarbonate resin (component B) is obtained by inserting a specific viscosity ($\eta_{sp}$) obtained at 20° C. from a solution prepared by dissolving 0.7 g of the polycarbonate resin in 100 ml of methylene chloride into the following equation. As for details of the polycarbonate resin, refer to JP-A 2002-129003.

$$\eta_{sp}/c=[\eta]+0.45\times[\eta]^2 c$$

([η] represents an intrinsic viscosity)
$[\eta]=1.23\times10^{-4}\ Mv^{0.83}$
$c=0.7$ Preferred examples of the polycarbonate resin having high heat resistance or a low water absorption coefficient which was polymerized by using another dihydric phenol are given below.

(1) Copolycarbonates comprising 20 to 80 mol % (preferably 40 to 75 mol %, more preferably 45 to 65 mol %) of a 4,4'-(m-phenylene diisopropylidene)diphenol (to be abbreviated as "BPM" hereinafter) component and 20 to 80 mol % (preferably 25 to 60 mol %, more preferably 35 to 55 mol %) of a 9,9-bis(4-hydroxy-3-methylphenyl)fluorene (to be abbreviated as "BCF" hereinafter) component based on 100 mol % of the dihydric phenol component constituting the polycarbonate.

(2) Copolycarbonates comprising 10 to 95 mol % (preferably 50 to 90 mol %, more preferably 60 to 85 mol %) of a bisphenol A component and 5 to 90 mol % (preferably 10 to 50 mol %, more preferably 15 to 40 mol %) of the BCF component based on 100 mol % of the dihydric phenol component constituting the polycarbonate.

(3) Copolycarbonates comprising 20 to 80 mol % (preferably 40 to 75 mol %, more preferably 45 to 65 mol %) of the BPM component and 20 to 80 mol % (preferably 25 to 60 mol %, more preferably 35 to 55 mol %) of a 1,1-bis(4-hydroxyphenyl)-3,3,5-trimethylcyclohexane component based on 100 mol % of the dihydric phenol component constituting the polycarbonate.

These special polycarbonates may be used alone or in combination of two or more. They may be mixed with a general-purpose bisphenol A type polycarbonate before use. As for the production processes and characteristic properties of these special polycarbonates, please refer to JP-A 6-172508, JP-A 8-27370, JP-A 2001-55435 and JP-A 2002-117580. Further, polycarbonate-polyorganosiloxane copolymers obtained by further copolymerizing a polyorganosiloxane unit may also be used.

Not only polycarbonate resins produced from virgin raw materials but also polycarbonate resins regenerated from used products may be used as the polycarbonate resin (component B). The used products include containers typified by water bottles, optical disks and car head lamps.

The content of the polycarbonate resin (component B) is 1 to 99 parts by weight, preferably 5 to 95 parts by weight based on 100 parts by weight of the total of the components A and B. It is more preferably 5 to 30 parts by weight or 70 to 95 parts by weight. When the content is 5 to 30 parts by weight, resin design making use of the excellent properties of the polyphenylene sulfide resin becomes possible. When the content is 70 to 95 parts by weight, resin design making use of the excellent properties of the polycarbonate resin becomes possible. When the content is lower than 1 part by weight, the characteristic feature of the polycarbonate resin is not developed and the production of a burr cannot be suppressed. When the content is higher than 99 parts by weight, the characteristic feature of the polyphenylene sulfide resin is not developed and chemical resistance deteriorates.

<Filler (Component C)>

A filler (component C) can be further contained in the present invention. Although the material thereof is not particularly limited, a fibrous, lamellar, powdery or particulate filler may be used.

Examples of the filler include fibrous fillers such as carbon fibers, glass fibers, aramid fibers, potassium titanate whiskers, zinc oxide whiskers, alumina fibers, silicon carbide fibers, ceramic fibers, asbestos fibers, calcium sulfate fibers and metal fibers. Silicates such as wollastonite, sericite, kaolin, mica, clay, bentonite, asbestos, talc and alumina silicate are also included. Expandable lamellar silicates such as montmorillonite and synthetic mica are further included. Metal compounds such as alumina, silicon oxide, magnesium oxide, zirconium oxide, titanium oxide and iron oxide are further included. Carbonates such as calcium carbonate, magnesium carbonate and dolomite are further included. Sulfates such as calcium sulfate and barium sulfate are further included. Nonfibrous fillers such as glass beads, ceramic beads, boron nitride, silicon carbide, calcium phosphate and silica are further included. These fillers may be hollow and further may be used in combination of two or more.

These fillers are preferably pre-treated with a coupling agent such as isocyanate-based compound, organic silane-based compound, organic titanate-based compound, organic borane-based compound or epoxy compound and the expandable lamellar silicates are preferably pre-treated with an organizing onion ion before use to obtain excellent mechanical strength.

The resin composition of the present invention may comprise a conductive filler as a filler for providing conductivity. The material thereof is not particularly limited, and any conductive filler which is generally used to make a resin conductive may be used, as exemplified by metal powders, metal flakes, metal ribbons, metal fibers, metal oxides, inorganic fillers coated with a conductive material, carbon powders, graphite, carbon fibers, carbon flakes and scale-like carbon.

Examples of the metal of the metal powders, metal flakes and metal ribbons include silver, nickel, copper, zinc, aluminum, stainless, iron, brass, chromium and tin.

Examples of the metal of the metal fibers include iron, copper, stainless, aluminum and brass.

The metal powders, metal flakes, metal ribbons and metal fibers may be surface-treated with a surface treating agent such as titanate-based, aluminum-based or silane-based surface treating agent.

The metal oxides include $SnO_2$ (antimony dope), $In_2O_3$ (antimony dope) and ZnO (aluminum dope) all of which may be surface-treated with a surface treating agent such as titanate-based, aluminum-based or silane-based coupling agent.

Examples of the conductive material in the inorganic fillers coated with a conductive material include aluminum, nickel, silver, carbon, $SnO_2$ (antimony dope) and $In_2O_3$ (antimony dope). The inorganic fillers to be coated include mica, glass beads, glass fibers, carbon fibers, potassium titanate whiskers, barium sulfate, zinc oxide, titanium oxide, aluminum borate whiskers, zinc oxide-based whiskers, titanic acid-based whiskers and silicon carbide whiskers. As means for coating the inorganic fillers, vacuum deposition, sputtering, electroless plating and baking methods may be used. These inorganic fillers may be surface-treated with a surface treating agent such as titanate-based, aluminum-based or silane-based coupling agent.

The carbon powders are classified into acetylene black, gas black, oil black, naphthalene black, thermal black, furnace black, lamp black, channel black, roll black and disk black according to the raw material and production process. Although the raw material and the production process of the carbon powders which may be used in the present invention are not particularly limited, acetylene black and furnace black are particularly preferably used.

The resin composition comprising carbon fibers as the filler (component C) is excellent in mechanical strength and electromagnetic shielding effect. The resin composition comprising wholly aromatic polyamide fibers as the filler (component C) is excellent in mechanical strength and slidability. The resin composition comprising glass fibers as the filler (component C) is excellent in mechanical strength and moist heat resistance.

The content of the filler (component C) is preferably 5 to 400 parts by weight, more preferably 10 to 200 parts by weight, particularly preferably 20 to 150 parts by weight based on 100 parts by weight of the total of the components A and B. When the content of the component C is lower than 5 parts by weight, stiffness and heat resistance may degrade and when the content is higher than 400 parts by weight, moldability may deteriorate disadvantageously.

<Other Components>

The resin composition of the present invention may comprise an elastomer component as long as the effect of the present invention is not impaired. Preferred examples of the elastomer component include core-shell graft copolymer resins such as acrylonitrile-butadiene-styrene-based copolymer (ABS resin), methyl methacrylate-butadiene-styrene copolymer (MBS resin) and silicone-acrylic composite rubber-based graft copolymer. Thermoplastic elastomers such as silicone-based thermoplastic elastomers, olefin-based thermoplastic elastomers, polyamide-based thermoplastic elastomers, polyester-based thermoplastic elastomers and polyurethane-based thermoplastic elastomers are also included.

The resin composition of the present invention may comprise another thermoplastic resin as long as the effect of the present invention is not impaired. Examples of the thermoplastic resin include general-purpose plastics typified by polyethylene resin, polypropylene resin and polyalkyl methacrylate resin. Engineering plastics typified by polyphenylene ether resin, polyacetal resin, aromatic polyester resin, liquid crystalline polyester resin, polyamide resin, cyclic polyolefin resin and polyarylate resin (amorphous polyarylate, liquid crystalline polyarylate) are further included. So-called "super-engineering plastics" such as polytetrafluoroethylene, polyether ether ketone, polyether imide, polysulfone and polyether sulfone are further included.

An antioxidant and heat stabilizer (such as hindered phenol-based, hydroquinone-based or phosphite-based heat stabilizer, or substituent thereof), weathering agent (such as resorcinol-based, salicylate-based, benzotriazole-based, benzophenone-based or hindered amine-based weathering agent), release agent and lubricant (such as montanic acid or a metal salt, ester or half ester thereof, stearyl alcohol, stearamide, bisamide, bisurea or polyethylene wax), pigment (such as cadmium sulfide, phthalocyanine or carbon black), dye (such as nigrosine), crystal nucleating agent (such as talc, silica, kaolin or clay), plasticizer (such as octyl p-oxybenzoate or N-butylbenzenesulfonamide), antistatic agent (such as an alkyl sulfate type anionic antistatic agent, quaternary ammonium salt type cationic antistatic agent, nonionic antistatic agent exemplified by polyoxyethylene sorbitan monostearate or betain-based amphoteric antistatic agent), flame retardant (such as red phosphor, phosphate, melamine cyanurate, hydroxide exemplified by magnesium hydroxide and aluminum hydroxide, ammonium polyphosphate, brominated polystyrene, brominated polyphenylene ether, brominated polycarbonate, brominated epoxy resin or a combination of these bromine-based flame retardants and antimony trioxide), and another polymer may be added to the resin composition of the present invention as long as the effect of the present invention is not impaired.

<Total Chlorine Content and Total Sodium Content of Resin Composition>

The total chlorine content of the resin composition of the present invention is not more than 550 ppm, preferably not more than 100 ppm, more preferably not more than 50 ppm. When the total chlorine content is higher than 550 ppm, the decomposition of the polycarbonate resin cannot be suppressed, whereby the polycarbonate resin cannot develop a burr suppression effect and, in a worse case, pelletization becomes difficult.

The total sodium content is not more than 30 ppm, preferably not more than 10 ppm, more preferably not more than 8 ppm. When the total sodium content is higher than 30 ppm, the decomposition of the polycarbonate resin cannot be suppressed as well, whereby the polycarbonate resin cannot develop a burr suppression effect and, in a worse case, pelletization becomes difficult. The total chlorine content was measured by ion chromatography (IC) and the total sodium content was measured by an ICP emission analyzing method (ICP-AES).

<Production of Resin Composition>

The resin composition of the present invention can be produced by mixing together the above components by means of a mixer such as tumbler, twin-cylinder mixer, Nauter mixer, Banbury mixer, kneading roll or extruder simultaneously or in an arbitrary order. The components are preferably melt kneaded together by means of a twin-screw extruder, and optional components are preferably supplied into other components which have been melt mixed together from a second feed port by using a side feeder as required.

The screw used in the twin-screw extruder is constituted such that screw pieces having various shapes are inserted between forward flight pieces for transport and intricately combined into a single integrated screw. An example thereof is a combination of screw pieces such as forward flight piece, forward kneading piece, back kneading piece and back flight piece which are arranged at suitable positions in a suitable order in consideration of the characteristic properties of a raw material to be treated.

One back feed screw element having a flight part with an arc-shaped cutout as shown in FIG. 2 of JP-A 2012-213997 is preferred. Examples of the melt kneader include a Banbury mixer, a kneading roll, a single-screw extruder and a multi-screw extruder having 3 or more screws, besides the twin-screw extruder.

The resin extruded as described above is pelletized by directly cutting it or by forming it into a strand and cutting the strand with a pelletizer. When the influence of extraneous dust must be reduced at the time of pelletization, the atmosphere surrounding the extruder is preferably made clean. The shape of the obtained pellet may be columnar, rectangular column-like, spherical or other ordinary shape but preferably columnar. The diameter of the column is preferably 1 to 5 mm, more preferably 1.5 to 4 mm, much more preferably 2 to 3.5 mm. The length of the column is preferably 1 to 30 mm, more preferably 2 to 5 mm, much more preferably 2.5 to 4 mm.

<Molded Article>

A molded article of the resin composition of the present invention can be obtained by molding the pellet produced as described above. It is preferably obtained by injection molding or extrusion molding. For injection molding, not only ordinary molding techniques but also injection compression molding, injection press molding, gas assist injection molding, foam molding (including what comprises the injection of a super-critical fluid), insert molding, in-mold coating molding, insulated runner molding, quick heating and cooling molding, two-color molding, multi-color molding, sandwich molding and super high-speed injection molding techniques may be used. For molding, either one of cold-runner molding and hot-runner molding techniques may be selected. A profile extrusion molded article, a sheet or a film is obtained by extrusion molding. To mold a sheet or a film, inflation, calendering and casting techniques may also be used. Further, specific drawing operation may be used to mold a heat shrinkable tube. The resin composition of the present invention can be formed into a molded article by rotational molding or blow molding as well.

EXAMPLES

The following examples and comparative examples are provided for the purpose of further illustrating the present invention but are in no way to be taken as limiting.

In Examples and Comparative Examples, the components shown in Table 1 were mixed together by means of a vented twin-screw extruder (TEX30XSST of The Nippon Steel Works, Ltd.) having a diameter of 30 mm in a ratio shown in Table 1 by supplying the component A from the first feed port at the root of the screw and the component B from an agitation blade type supply device provided above a meter (CWF of Kubota Corporation). The component C was supplied to a side feeder in a predetermined ratio by using a vibration type supply device provided above the above meter and to the extruder through the feeder. Extrusion was carried out at a cylinder temperature of 320° C. and a die temperature of 320° C. to produce a strand at a screw revolution of 250 rpm and a discharge rate of 15 kg/hr without carrying out vent suction, and then the strand was pelletized with a pelletizer.

In Comparative Examples 3 and 4, as the strand moved violently, pelletization was impossible and the following evaluations could not be made.

After this pellet was dried at 130° C. for 6 hours, it was formed into a 1.5 mm-thick test piece for UL combustion at a molding temperature of 320° C., a mold temperature of 130° C. and an injection pressure of 70 MPa by means of the T-150D injection molding machine of FANUC Corporation. A gas vent having a thickness of 200 μm and a width of 12 mm was formed in the final filling part. The mold temperature was changed to 100° C. in Example 1, Example 2, Comparative Example 1, Comparative Example 2 and Comparative Example 7.

The TEX-30XSST of The Nippon Steel Works, Ltd. used is a vented twin-screw extruder having one back feed screw element with a flight part having an arc-shaped cutout as shown in FIG. 2 of JP-A 2012-213997.

[Weight Average Molecular Weight (Mw) and Number Average Molecular Weight (Mn) of Polyarylene Sulfide Resin]

The weight average molecular weight (Mw) and number average molecular weight (Mn) of the polyarylene sulfide resin were calculated in terms of polystyrene by gel permeation chromatography (GPC). 1-chloronaphthalene was used as a solvent, and the column temperature was 210° C.

The degree of dispersion (Mw/Mn) was calculated from the calculated weight average molecular weight (Mw) and number average molecular weight (Mn).

[Viscosity Average Molecular Weight of Polycarbonate Resin]

The polycarbonate resin was extracted from the pellet with methylene chloride to measure its viscosity average molecular weight by the method described in this text.

[Total Chlorine Content of Resin Composition]

The total chlorine content was determined by ion chromatography (IC) by burning the pellet in an Ar/$O_2$ air stream at 900° C. and making an absorption solution absorb the generated gas.

[Total Sodium Content of Resin Composition]

The total sodium content was determined by an ICP emission analyzing method (ICP-AES) after sulfuric acid was added to the pellet to ash it and the asked product was molten with potassium bisulfate, dissolved in diluted nitric acid and made a constant volume with pure water. The ICP-AES VISTA-MPX of Varian Medical Systems was used as the measurement instrument.

[Evaluation of Burr]

The evaluation of a burr was carried out by measuring the length of a burr in a part in contact with the gas vent of the above test piece.

[Evaluation of Chemical Resistance]

The above test piece was immersed in gasoline, and its appearance was observed after 24 hours. ○ means that there was no change in appearance and X means that the test piece was cracked.

[Flexural Strength]

This was measured in accordance with ISO178 (measurement condition of 23° C.). A test piece was formed at a cylinder temperature of 320° C. and a mold temperature of 130° C. by means of an injection molding machine (SG-150U of Sumitomo Heavy Industries, Ltd.). As this numerical value becomes larger, the mechanical strength of the resin composition becomes higher.

[Electromagnetic Shielding Effect]

A test piece (size: 150 mm in length×150 mm in width× 1.5 mm in thickness) formed under the same conditions as in the above [flexural strength] was put in an atmosphere having a temperature of 23° C. and a relative humidity of 50% RH to measure an electric field wave (frequency of 800 MHz) by using the TR-17301A and R3361A of Advantest Corporation. As this numerical value becomes larger, the resin composition becomes more excellent in electromagnetic shielding effect.

[Dynamic Friction Coefficient]

The AFT-15M reciprocating dynamic friction abrasion tester of Orientec Co., Ltd. was used as an evaluation device. A pin-like test piece (material: steel) having a spherical surface at the end produced by bonding a hemisphere having a diameter of 5 mm to a column having a diameter of 5 mm and a length of 30 mm at their circular cross sections was attached to a fixing side test piece holder. Meanwhile, flat test pieces having a length of 150 mm, a width of 150 mm and a thickness of 2 mm (having a fin gate having a width of 40 mm and a thickness of 1 mm from the end of one side) were formed from the resin compositions of Examples by injection molding, center parts thereof were cut to a length of 50 mm and a width of 100 mm, and the obtained test pieces were fixed to a reciprocating pedestal. The spherical surface at the end of the above pin-like test piece was brought into contact with the flat part of each of the flat test pieces under a load of 9.8 N in such a manner that the axial direction of the column of the pin-like test piece became parallel to the normal direction of the flat plane of the flat test piece. In this contact state, they were reciprocated a one-way distance of 25 mm 1,000 times over one straight line within the plane at a speed of 2 seconds per reciprocation in an atmosphere having a temperature of 23° C. and a relative humidity of 50% RH to measure friction force after 1,000 times of operation with a 49 N load cell connected to the pin-like test piece in order to calculate the dynamic friction coefficient from the relationship with the above load. As this numerical value becomes smaller, the slidability of the resin composition becomes higher. The flat test pieces were formed at a cylinder temperature of 320° C. and a mold temperature of 130° C. by means of an injection molding machine (SG-150U of Sumitomo Heavy Industries, Ltd.).

[Impact Strength]

The notched non-Charpy impact strength of a test piece (size: 80 mm in length×10 mm in width×4 mm in thickness) was measured by an ISO179-based method in an atmosphere having a temperature of 23° C. and a relative humidity of 50% RH. The test piece was formed under the same conditions as in the above [dynamic friction coefficient]. As this numerical value becomes larger, the impact resistance of the resin composition becomes higher.

[Initial Tensile Strength, Tensile Strength after PCT Treatment]

These were measured in accordance with ISO527-1&2 (measurement condition of 23° C.). A test piece was formed at a cylinder temperature of 320° C. and a mold temperature of 130° C. by means of an injection molding machine (SG-150U of Sumitomo Heavy Industries, Ltd.). The test piece was measured in an initial state and after PCT treatment. As the initial numerical value becomes larger and a reduction from the initial numerical value to the numerical value after PCT treatment becomes smaller, the resin composition becomes more excellent in moist heat resistance and mechanical strength.

[PCT Treatment]

The test piece was treated at a temperature of 120° C. and a humidity of 100% for 100 hours by using the PC-305III/V pressure cooker tester of Hirayama Manufacturing Corporation.

<Component A>

PPS1: polyphenylene sulfide resin obtained by the following production process

A mixture of 300.0 g of p-diiodobenzene (pDIB), 29.15 g of solid sulfur and 1.48 g of 4-iodobiphenyl as a polymerization terminator was molten at 180° C. The polymerization reaction of the molten mixture was carried out at a temperature of 220° C. and a pressure of 350 Torr (46.7 kPa) for 1 hour; at a temperature of 230° C. and a pressure of 200 Torr (26.7 kPa) for 2 hours; at a temperature of 250° C. and a pressure of 120 Torr (16.0 kPa) for 1 hour; by reducing the pressure to 60 Torr (8.0 kPa) for 1 hour; by raising the temperature to 280° C. for 1 hour; by reducing the pressure to 10 Torr (1.3 kPa) for 1 hour; and at a temperature of 300° C. and a pressure of 1 Torr (0.13 kPa) or less for 4 hour, totaling 11 hours, to produce a polyphenylene sulfide resin.

The total chlorine content was not more than 20 ppm (below the detection limit), and the total sodium content was 7 ppm. The degree of dispersion (Mw/Mn) represented by weight average molecular weight (Mw) and number average molecular weight (Mn) was 3.4.

PPS2: polyphenylene sulfide resin (manufactured by DIC Corporation, DIC-PPS, MA-505, total chlorine content of 2,200 ppm, total sodium content of 160 ppm, degree of dispersion (Mw/Mn) of 3.5)

PPS3: Polyphenylene sulfide resin was obtained by melt kneading together 80 wt % of PPS1 and 20 wt % of PPS2 by means of the above twin-screw extruder. The total chlorine content was 330 ppm, and the total sodium content was 26 ppm. The degree of dispersion (Mw/Mn) was 3.4.

PPS4: Polyphenylene sulfide resin was obtained by melt kneading together 60 wt % of PPS1 and 40 wt % of PPS2 by means of the above twin-screw extruder. The total chlorine content was 870 ppm, and the total sodium content was 67 ppm. The degree of dispersion (Mw/Mn) was 3.5.

PPS5: polyphenylene sulfide resin obtained by melt heating a cyclic PPS compound (total chlorine content of not more than 20 ppm (below the detection limit), total sodium content of 7 ppm, degree of dispersion (Mw/Mn) of 2.4)

<Component B>

PC1: linear polycarbonate resin (manufactured by Teijin Limited, viscosity average molecular weight of 24,000, total chlorine content of 60 ppm, total sodium content of less than 1 ppm)

PC2: linear polycarbonate resin (manufactured by Teijin Limited, viscosity average molecular weight of 24,000, total chlorine content of 800 ppm, total sodium content of less than 1 ppm)

Si-PC: siloxane copolycarbonate resin (manufactured by Teijin Limited, Si content of 4 wt. %, viscosity average molecular weight of 24,000, total chlorine content of 80 ppm, total sodium content of less than 1 ppm)

Branched PC: polycarbonate resin having a branched structure (manufactured by Teijin Limited, branch rate of 0.9 mol %, viscosity average molecular weight of 24,000, total chlorine content of 90 ppm, total sodium content of less than 1 ppm <Component C>

GF: glass chopped strand (manufactured by Owens Corning Corporation, 910-10P)

CF: carbon fiber (manufactured by Toho Tenax Co., Ltd.: HT C432 6 mm, long diameter of 7 μm, cut length of 6 mm, urethane-based sizing agent)

Aramid: wholly aromatic polyamide fiber (manufactured by Teijin Limited.: para-aramid fiber, T 322EH, long diameter of 12 μm, cut length of 3 mm, polyester-based sizing agent)

TABLE 1

| | | Ex. 1 | Ex. 2 | Ex. 3 | C. Ex. 1 | C. Ex. 2 | C. Ex. 3 | Ex. 4 | C. Ex. 4 |
|---|---|---|---|---|---|---|---|---|---|
| Component A | PPS1 | 90 | | | 10 | | | 50 | |
| | PPS2 | | | | 90 | | 10 | | 50 |
| | PPS3 | | 90 | | | | | | |
| | PPS4 | | | | | 90 | | | |
| | PPS5 | | | | | | | | |
| Component B | PC1 | | | 90 | | 90 | 50 | 50 | |
| | PC2 | | | | | | | | |
| | Si-PC | | | | | | | | |
| | Branched PC | 10 | 10 | | 10 | 10 | | | |
| Inorganic filler | GF | | | | | | | 66 | 66 |
| Total chlorine content | ppm | <20 | 240 | 40 | 1590 | 630 | 750 | <20 | 540 |
| Total sodium content | ppm | 6 | 23 | <1 | 140 | 60 | 16 | 2 | 48 |
| PC molecular weight | | 20900 | 16700 | 21800 | 7700 | 9900 | 9200 | 20800 | 8200 |
| Burr length | μm | 320 | 360 | 80 | 480 | 450 | pelletization impossible | 140 | pelletization impossible |
| Chemical resistance | — | ○ | ○ | ○ | ○ | ○ | — | ○ | — |

| | | Ex. 5 | Ex. 6 | Ex. 7 | Ex. 8 | C. Ex. 5 | C. Ex. 6 | C. Ex. 7 | C. Ex. 8 |
|---|---|---|---|---|---|---|---|---|---|
| Component A | PPS1 | | 20 | 90 | | | 100 | | |
| | PPS2 | | | | | | | | |
| | PPS3 | 50 | | | | | | | |
| | PPS4 | | | | 70 | | | | |
| | PPS5 | | | | | | | 90 | 50 |
| Component B | PC1 | | 80 | | | 100 | | | 50 |
| | PC2 | 50 | | | 30 | | | | |
| | Si-PC | | | 10 | | | | | |
| | Branched PC | | | | | | | 10 | |
| Inorganic filler | GF | 66 | 66 | 66 | 66 | 66 | | | 66 |
| Total chlorine content | ppm | 270 | 20 | <20 | 410 | 30 | <20 | <20 | <20 |
| Total sodium content | ppm | 8 | <1 | 4 | 28 | <1 | 7 | 6 | 2 |
| PC molecular weight | | 19800 | 21400 | 19800 | 15800 | 22000 | — | 20300 | 20300 |

TABLE 1-continued

| | | | | | | | | | |
|---|---|---|---|---|---|---|---|---|---|
| Burr length | μm | 190 | 60 | 280 | 290 | 10 | 460 | 450 | 230 |
| Chemical resistance | — | ○ | ○ | ○ | ○ | x | ○ | ○ | ○ |

| | | Example 9 | Example 10 | Example 11 |
|---|---|---|---|---|
| Component A | PPS1 | 50 | 50 | 50 |
| | PPS2 | | | |
| | PPS3 | | | |
| | PPS4 | | | |
| | PPS5 | | | |
| Component B | PC1 | 50 | 50 | 50 |
| | PC2 | | | |
| | Si-PC | | | |
| | Branched PC | | | |
| Filler | CF | 45 | | |
| | Aramid | | 45 | |
| | GF | | | 45 |
| Total chlorine content | ppm | <20 | <20 | <20 |
| Total sodium content | ppm | 2 | 2 | 2 |
| PC molecular weight | | 19800 | 19700 | 21000 |
| Burr length | μm | 150 | 130 | 170 |
| Chemical resistance | — | ○ | ○ | ○ |
| Flexural strength | MPa | 220 | — | — |
| Electromagnetic shielding effect | dB | 32 | — | — |
| Dynamic friction coefficient | — | — | 0.18 | — |
| Impact strength | kJ/m² | — | 30 | — |
| Initial tensile strength | MPa | — | — | 120 |
| Tensile strength after PCT treatment | MPa | — | — | 90 |

Ex.: Example,
C. Ex.: Comparative Example

EFFECT OF THE INVENTION

The resin composition of the present invention suppresses the decomposition of the polycarbonate resin at the time of molding while it retains the excellent characteristic properties of the polyarylene sulfide resin. As a result, it has excellent toughness, impact strength, burr reducing property and chemical resistance.

INDUSTRIAL APPLICABILITY

The resin composition of the present invention is suitable for use in electric and electronic parts, vehicle parts, aircraft parts and housing equipment parts.

The invention claimed is:

1. A resin composition comprising (A) 99 to 1 part by weight of a polyarylene sulfide resin (component A) having a degree of dispersion (Mw/Mn) represented by weight average molecular weight (Mw) and number average molecular weight (Mn) of not less than 2.7 and (B) 1 to 99 parts by weight of a polycarbonate resin (component B) and having a total chlorine content of not more than 550 ppm and a total sodium content of not more than 30 ppm, wherein said part by weight and parts by weight are based on 100 parts by weight of the total of the components A and B.

2. The resin composition according to claim 1, wherein the component A is a polyarylene sulfide resin having a total chlorine content of not more than 550 ppm and a total sodium content of not more than 30 ppm.

3. The resin composition according to claim 1, wherein the component A is a polyarylene sulfide resin having a total chlorine content of not more than 50 ppm and a total sodium content of not more than 8 ppm.

4. The resin composition according to claim 1, comprising 5 to 400 parts by weight of a filler (component C) based on 100 parts by weight of the total of the components A and B.

5. The resin composition according to claim 1, wherein the component A is a polyarylene sulfide resin obtained by directly heating and polymerizing a diiodoaryl compound and solid sulfur without a polar solvent.

* * * * *